US008289280B2

(12) United States Patent
Travis

(10) Patent No.: US 8,289,280 B2
(45) Date of Patent: Oct. 16, 2012

(54) KEY SCREENS FORMED FROM FLEXIBLE SUBSTRATE

(75) Inventor: Adrian Travis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 12/535,976

(22) Filed: Aug. 5, 2009

(65) Prior Publication Data

US 2011/0032189 A1    Feb. 10, 2011

(51) Int. Cl.
*G06F 3/02* (2006.01)
(52) U.S. Cl. ........................................................ 345/168
(58) Field of Classification Search .................. 345/168, 345/169, 170, 172; 341/22, 23; 400/485, 400/489, 490, 491
See application file for complete search history.

(56) References Cited

U.S. PATENT DOCUMENTS

| | | | |
|---|---|---|---|
| 6,803,903 B1 | 10/2004 | Ostergård et al. | |
| 7,477,239 B2 | 1/2009 | Ray | |
| 7,982,715 B2 * | 7/2011 | Lawton et al. | 345/168 |
| 2007/0285393 A1 * | 12/2007 | Ishakov | 345/168 |
| 2008/0001787 A1 | 1/2008 | Smith et al. | |
| 2008/0204417 A1 | 8/2008 | Pierce et al. | |
| 2008/0252605 A1 | 10/2008 | Muyskens et al. | |
| 2009/0033627 A1 | 2/2009 | Aasen | |
| 2009/0051657 A1 * | 2/2009 | Kim et al. | 345/168 |

OTHER PUBLICATIONS

Hollan, Jim., "SLAP: Silicone Illuminated Active Peripherals", Retrieved at << http://life.calit2.net/archives/2008/07/slap-silicone-illuminated-acti.php >>, pp. 8.
Villar et al., "A Malleable Control Structure for Softwired User Interfaces", 2007, Tangible and embedded interaction, Proceedings of the 1st international conference on Tangible and embedded interaction , Retrieved at << http://eis.comp.lancs.ac.uk/~villar/publications/pdf/malleable_softwired_tei.pdf >>, pp. 8.

* cited by examiner

*Primary Examiner* — Chanh Nguyen
*Assistant Examiner* — Tsegaye Seyoum
(74) *Attorney, Agent, or Firm* — Alleman Hall McCoy Russell & Tuttle LLP

(57) ABSTRACT

Various embodiments related to an adaptive keyboard cut from a single flexible substrate are provided. One disclosed embodiment of an adaptive input device comprises a flexible substrate, and a plurality of key screens defined in the flexible substrate via cuts in the flexible substrate. The key screens are cut such that each key screen remains electrically connected to the flexible substrate, and each key screen comprises an image producing element configured to display an image on the key screen. The adaptive input device further comprises a keyboard comprising a plurality of keys disposed over the flexible substrate, where each key screen is turned upwardly from the flexible substrate to cover a corresponding key on the keyboard.

20 Claims, 2 Drawing Sheets

KEY SCREENS FORMED FROM FLEXIBLE SUBSTRATE

BACKGROUND

Input devices such as keyboards may be used to interface with computing devices. For example, keyboards may include keys that, when actuated by a user, indicate a command to the computing device. Recently, keyboards have been introduced in which there is an electronic display on the surface of each key so that the label on the key can be made to change when the role of the key changes. However, such keyboards face technical challenges, as it may be laborious to fix a small display on each key and wire the displays together in the correct sequence.

SUMMARY

Various embodiments related to an adaptive keyboard comprising key display screens ("key screens") cut from a single flexible substrate are disclosed herein. One disclosed embodiment of an adaptive input device comprises a flexible substrate, and a plurality of key screens defined in the flexible substrate via cuts in the flexible substrate. The key screens are cut such that each key screen remains electrically connected to the flexible substrate, and each key screen comprises an image producing element configured to display an image on the key screen. The adaptive input device further comprises a keyboard comprising a plurality of keys disposed over the flexible substrate, where each key screen is turned upwardly from the flexible substrate to cover a corresponding key on the keyboard.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, the construction of computer keyboards comprising an electronic display on the surface of each key may pose technical challenges, as it may be expensive and laborious to fix a small display on each key and then wire the displays together in the correct sequence. Therefore, various embodiments related to adaptive input devices, such as computer keyboards, comprising key screens cut from a single substrate are disclosed herein that may allow for a simplified manufacturing process and/or lower manufacturing cost, as described in more detail hereafter.

Figure 1:
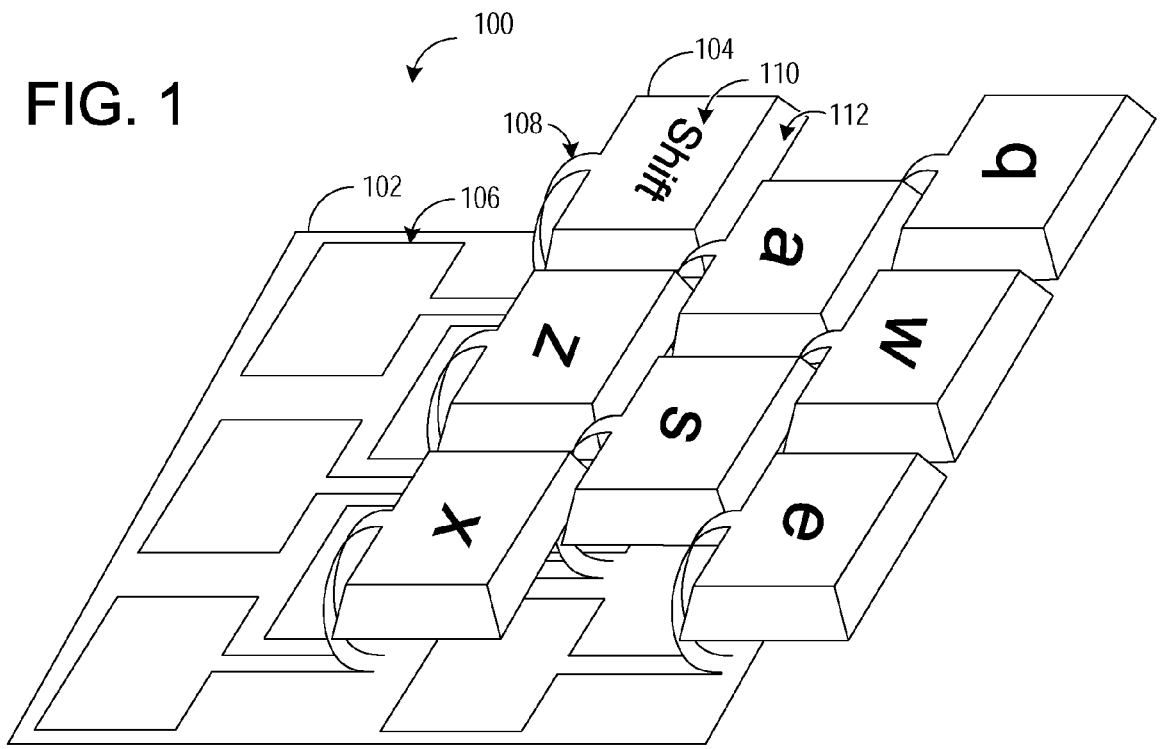
FIG. 1 shows a schematic depiction of an embodiment of an example adaptive input device.

FIG. 1 illustrates a schematic depiction of an embodiment of an example adaptive input device 100, in the form of a computer keyboard. It will be understood that only a portion of the keyboard is shown for clarity. Adaptive input device 100 includes a flexible substrate 102 from which a plurality of key screens, such as key screen 104, are formed via cuts 106 in flexible substrate 102. Key screens such as key screen 104 are cut such that each key screen remains electrically connected to flexible substrate by a connector portion of the flexible substrate formed by the cuts, such as the example connector portion 108 depicted in FIG. 1. Further, the connector portion may comprise one or more electrical connectors, for example, leading to an edge of the substrate (not shown) for connection to other circuitry. Flexible substrate 102 may be any suitable substrate material that is flexible as well as cutable. Nonlimiting examples of materials that may be used for flexible substrate 102 include, but are not limited to, polyimides.

Each key screen 104 comprises an image producing element configured to display an image on the key screen, such as example image 110. Nonlimiting examples of suitable image producing elements include organic light emitting devices and electrophoretic materials. Each key screen also may comprise an array of transistors (not shown) or other electronic control elements to control the individual pixels of each key screen. In some embodiments, polymer transistors may be used so that the key screens are flexible (e.g. to conform to the surface shape of a keyboard key), while in other embodiments, any other suitable circuitry may be used.

The plurality of key screens are coupled to a keyboard including a plurality of keys, such as that depicted schematically at 112, disposed over flexible substrate 102. Each key screen 104 may be turned upwardly from the flexible substrate 102 to cover a corresponding key on the keyboard, such that the connector portion remains connected to a bulk portion of the flexible substrate from which the key screens were cut. By cutting the key screens from the flexible substrate, not only may the manufacturing process be simplified and therefore more cost effective, but the connecting portions of the flexible substrate allow the key screens to remain electrically connected to the substrate, as described in more detail hereafter. It will be understood that any suitable keyboard may be used in conjunction with the plurality of key screens and flexible substrate to form an adaptive input device.

Figure 2:
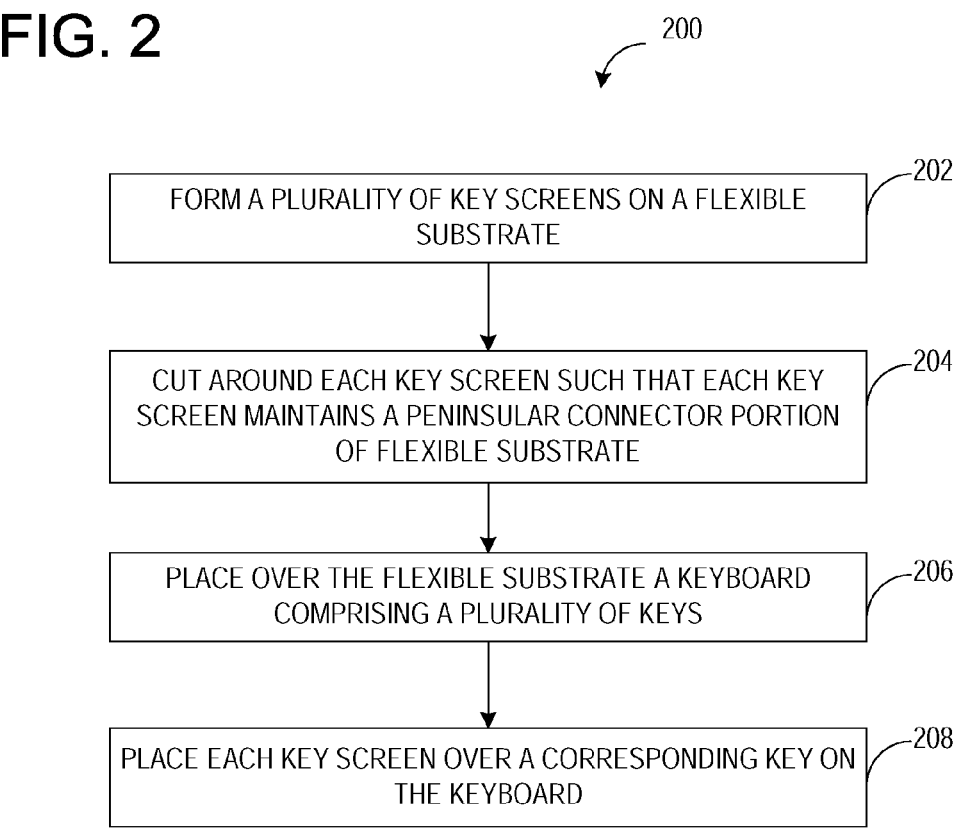
FIG. 2 shows a flow diagram of an embodiment of an example method of manufacturing an adaptive input device.

FIG. 2 illustrates a flow diagram of an embodiment of an example method 200 of manufacturing an adaptive input device. At 202, method 200 includes forming a plurality of key screens on a flexible substrate, wherein each key screen comprises an image producing element configured to display an image on the key screen. The key screens may be formed, for example, by first forming an array of transistors (e.g. polymer transistors, inorganic transistors, etc.), and then forming pixels of a light modulating material and/or light emitting material over and in electrical communication with the transistors. Other circuitry, such as demultiplexer circuitry configured to demultiplex a signal for the key screen received via the connector portion, also may be formed.

Any suitable material may be used for the image producing elements. For example, in some embodiments, a light-emitting structure, such as organic light emitting device (OLED), may be used as image producing elements in a key screen The use of OLEDs may allow for the construction of color displays, where each pixel includes a plurality of different organic light-emitting materials configured to produce different colors of light. OLEDs are emissive, and therefore may provide a brighter image than a subtractive light modulator. However, OLEDs may be relatively expensive to fabricate.

In other embodiments, forming the key screens may comprise depositing a non-emissive material, such as an electrophoretic material, over an array of transistors (polymer or other) printed on the flexible substrate. Any suitable electrophoretic material may be used. For example, in one case, the electrophoretic material is formed from a suspension of microcapsules that include a portion colored with a black pigment and portion colored with a white pigment, wherein the portions are of opposite electrical polarities such that the color that the capsule displays at a viewing surface may be designated by applying an electric field. Such electrophoretic materials may be used to form black-and-white displays. Electrophoretic materials may utilize less power than OLEDs. Further, electrophoretic materials may be bistable, in that unlike traditional displays, they are capable of holding text and images indefinitely without drawing electricity, yet may still be changed thereafter. Additionally, use of electrophoretic materials on a flexible substrate may yield an adaptive input device having an albedo suitable for a daylight-readable display. Further, the use of an electrophoretic material to form a key screen may be less expensive than the use of OLEDs.

Returning to FIG. 2, at 204, method 200 next includes cutting around each key screen on the flexible substrate such that each key screen maintains a peninsular connector portion of flexible substrate electrically connecting the key screen to the flexible substrate. The connector portion may include one or more electrical connections, for example, to electrically couple the key screens to other circuitry at an edge of the substrate. The connector portion, being formed from the same flexible substrate as the key screen, can flex so as to allow the cut-out key screen to be turned upwardly from the substrate.

Figure 3:
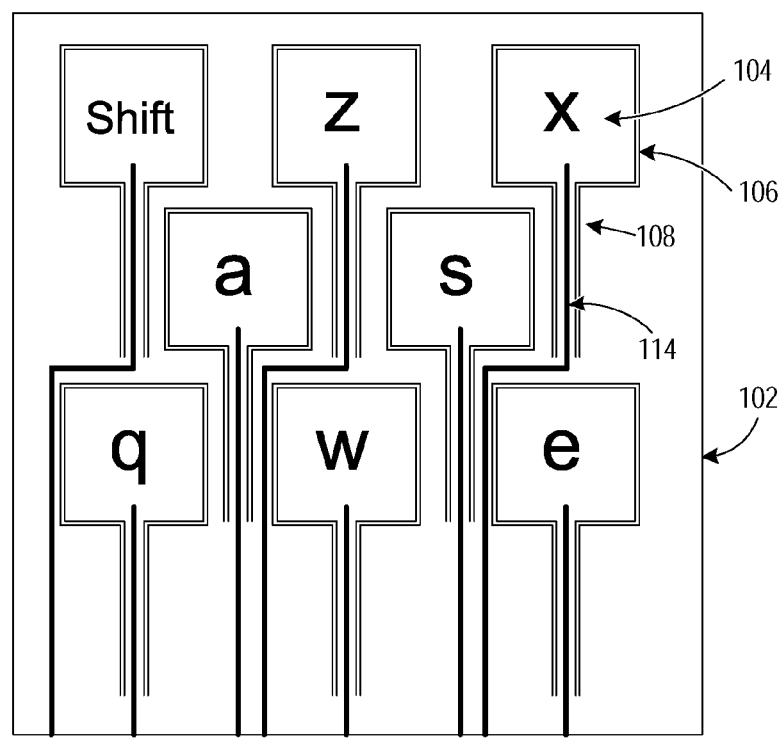
FIG. 3 shows a schematic depiction of the flexible substrate of FIG. 1 prior to cutting around the individual key screens.
Figure 4:
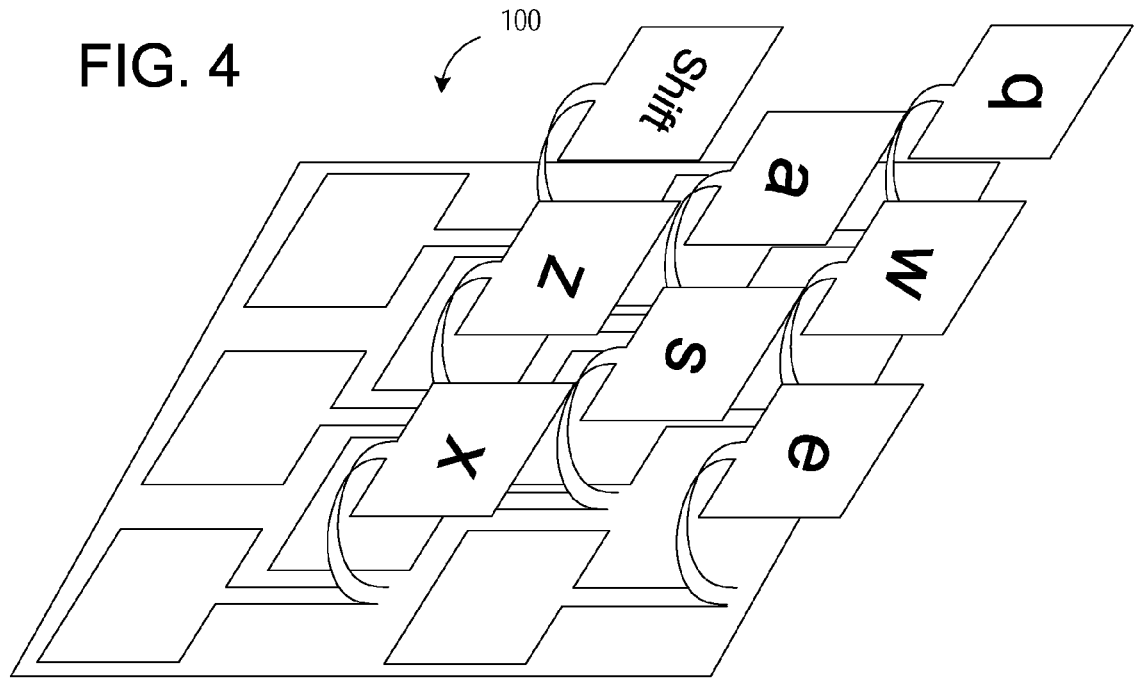
FIG. 4 shows a schematic depiction of the flexible substrate of FIG. 1 with the individual key screens turned upwardly for mounting to keys of a keyboard.

As an example, FIG. 3 shows a schematic depiction of an embodiment of an example flexible substrate 102 for an adaptive input device, wherein a plurality of key screens have been formed, including example key screen 104. Flexible substrate 102 has been cut such that each key screen remains connected to a bulk portion of the substrate via a connector portion, such as illustrated by cut 106 corresponding to key screen 104 and connector portion 108. As described above, each connector portion may include electrical connections such that each key screen remains electrically connected to the flexible substrate. As an example, connector portion 108 includes electrical connection 114 corresponding to key screen 104. Next referring to FIG. 4, the key screens are turned up to allow the individual key screens to be coupled to corresponding keyboard keys (not shown in FIG. 4).

Returning to FIG. 2, at 206 method 200 includes placing over the flexible substrate a keyboard comprising a plurality of keys, and then placing each key screen over a corresponding key on the keyboard, such as is illustrated at FIG. 1 for example flexible substrate 102. The key screens remain connected to the bulk of the flexible substrate, thereby allowing electrical connectors disposed on the connector portions to carry signals to the keyboards. Further, the flexibility of the connector portions allows them to flex when keyboard keys are depressed, such that the electrical connections to each key screen do not impede keyboard performance. This flexibility also may provide some spring force, thereby helping to provide a rebound effect and/or tactile feedback in response to depression of a keyboard key, either alone or in combination with other mechanical structures (not shown) in the keyboard.

The key screens may be fixed to the keyboard keys in any suitable manner. For example, in some embodiments, an adhesive may be used to affix the key screens to the corresponding keyboard keys. Additionally or alternatively, a transparent or translucent cap may be placed over the key screen and key. It will be understood that these methods of fixing the key screens to keyboard keys are presented for the purpose of example, and are not intended to be limiting in any manner.

While the present embodiments are disclosed in the context of forming a plurality of key screens from a single flexible substrate, it will be understood that two or more substrates may be used to form key screens for an interactive keyboard in a similar manner. It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An adaptive input device for a computing device, the adaptive input device comprising:
   a flexible substrate;
   a plurality of key screens defined in the flexible substrate via cuts in the flexible substrate such that each key screen remains electrically connected to the flexible substrate, wherein said each key screen comprises an image producing element configured to display an image on the key screen; and
   a keyboard comprising a plurality of keys disposed over the flexible substrate, said each key screen being turned upwardly from the flexible substrate to cover a corresponding key of said plurality of keys on the keyboard.

2. The adaptive input device of claim 1, wherein the image producing element comprises an organic light emitting device (OLED).

3. The adaptive input device of claim 1, wherein the image producing element comprises an electrophoretic material.

4. The adaptive input device of claim 3, wherein the electrophoretic material is in electrical communication with an array of transistors printed on the flexible substrate.

5. The adaptive input device of claim 4, wherein the array of transistors includes one or more polymer transistors.

6. The adaptive input device of claim 1, wherein the key screens are bonded to the keys via an adhesive.

7. The adaptive input device of claim 1, wherein each key screen is affixed to a corresponding key via a cap placed over the key screen and key.

8. The adaptive input device of claim 1, wherein each key screen remains electrically connected to the flexible substrate by a connector portion of the flexible substrate, the connector portion comprising one or more electrical connectors.

9. The adaptive input device of claim 8, wherein each connector portion is configured to flex in response to depression of the corresponding key, and to provide a rebound effect including tactile feedback when the corresponding key is actuated.

10. An adaptive keyboard for interfacing with a computing device, the adaptive keyboard comprising:
   a flexible substrate;
   a plurality of key screens defined in the flexible substrate via cuts in the flexible substrate such that each key screen remains electrically connected to the flexible substrate via a connector portion of the flexible substrate, wherein said each key screen comprises electrophoretic material configured to display an image on the key screen; and
   a keyboard comprising a plurality of keys disposed over the flexible substrate, said each key screen being turned upwardly from the flexible substrate to cover a corresponding key of said plurality of keys on the keyboard, wherein the connector portion of the flexible substrate corresponding to said each key screen is configured to flex in response to depression of the key.

11. The adaptive keyboard of claim 10, wherein each connector portion is further configured to provide a rebound effect including tactile feedback when the corresponding key is actuated.

12. The adaptive keyboard of claim 10, wherein each connector portion comprises one or more electrical connections.

13. The adaptive keyboard of claim 10, wherein the electrophoretic material is disposed over an array of transistors printed on the flexible substrate.

14. The adaptive keyboard of claim 13, wherein the array of transistors includes one or more polymer transistors.

15. The adaptive keyboard of claim 10, wherein each key screen is affixed to each key via an adhesive.

16. The adaptive keyboard of claim 10, wherein each key screen is affixed to each key via a cap placed over the key screen and key.

17. A method of manufacturing an adaptive input device, the method comprising:

forming a plurality of key screens on a flexible substrate, each key screen comprising an image producing element configured to display an image on the key screen;

cutting around said each key screen on the flexible substrate such that said each key screen maintains a peninsular connector portion of flexible substrate electrically connecting the key screen to the flexible substrate;

placing over the flexible substrate a keyboard comprising a plurality of keys; and placing said each key screen over a corresponding key of said plurality of keys on the keyboard.

18. The method of claim 17, wherein forming the key screens includes forming organic light emitting devices on the flexible substrate.

19. The method of claim 17, wherein forming the key screens includes placing an electrophoretic material on an array of transistors printed on the flexible substrate.

20. The method of claim 17, wherein placing each key screen over the corresponding key on the keyboard comprises bending the associated peninsular connector portion such that the key screen is turned upwardly from the flexible substrate to cover the key.

* * * * *